(12) United States Patent
Plemmons

(10) Patent No.: US 12,391,190 B1
(45) Date of Patent: Aug. 19, 2025

(54) PHONE HOLDER FOR A VEHICLE CUP HOLDER

(71) Applicant: Clay Plemmons, Candler, NC (US)

(72) Inventor: Clay Plemmons, Candler, NC (US)

( * ) Notice: Subject to any disclaimer, the term of this patent is extended or adjusted under 35 U.S.C. 154(b) by 411 days.

(21) Appl. No.: 18/092,487

(22) Filed: Jan. 3, 2023

Related U.S. Application Data

(60) Provisional application No. 63/296,198, filed on Jan. 4, 2022.

(51) Int. Cl.
*B60R 11/02* (2006.01)
*B60R 11/00* (2006.01)

(52) U.S. Cl.
CPC ... *B60R 11/0241* (2013.01); *B60R 2011/0003* (2013.01)

(58) Field of Classification Search
CPC .................. B60R 11/0241; B60R 2011/0003
USPC ........................................................ 455/575.9
See application file for complete search history.

(56) References Cited

U.S. PATENT DOCUMENTS

| | | | | |
|---|---|---|---|---|
| 7,099,466 B2* | 8/2006 | Walsh | ............... | H04M 1/04 379/446 |
| D546,823 S | 7/2007 | Dayan | | |
| 8,027,465 B2 | 9/2011 | Rohrbach | | |
| 8,387,790 B2* | 3/2013 | Conner | ............... | A45C 11/00 206/320 |
| 8,439,238 B1* | 5/2013 | Harter | ............... | B60R 11/02 224/544 |
| 9,162,630 B2* | 10/2015 | Pluta | ............... | B60R 11/02 |
| 10,576,905 B1* | 3/2020 | MacNeil | ............... | H04B 1/3877 |
| 11,091,097 B1* | 8/2021 | Woodward | ............... | B60R 11/00 |
| 2004/0086112 A1* | 5/2004 | Hilger | ............... | B60R 11/0241 379/455 |
| 2012/0285907 A1* | 11/2012 | Emmons | ............... | F16M 13/00 211/26 |
| 2012/0298708 A1* | 11/2012 | DeAngelo | ............... | B60N 3/103 224/567 |
| 2018/0001835 A1* | 1/2018 | Corso | ............... | B60N 3/103 |
| 2020/0130604 A1* | 4/2020 | Macneil | ............... | H04M 1/04 |
| 2020/0186632 A1* | 6/2020 | Iverson | ............... | H04M 1/04 |

FOREIGN PATENT DOCUMENTS

| | | | | |
|---|---|---|---|---|
| WO | WO-9641729 A3 * | 3/1997 | ............... | B60N 3/10 |
| WO | 9742057 | 11/1997 | | |
| WO | WO-9742057 A1 * | 11/1997 | ............... | B60N 3/103 |

* cited by examiner

*Primary Examiner* — Mahendra R Patel

(74) *Attorney, Agent, or Firm* — Kyle A. Fletcher, Esq.

(57) ABSTRACT

The phone holder for a vehicle cup holder is a mechanical structure configured for use with a vehicle cup holder. The phone holder for a vehicle cup holder is configured for use with a first personal data device. The phone holder for a vehicle cup holder secures the first personal data device to a vehicle. The phone holder for a vehicle cup holder comprises a mounting structure, a pedestal, and a threaded connection. The threaded connection attaches the pedestal to the mounting structure. The pedestal anchors the mounting structure into the vehicle cup holder. The first personal data device mounts in the mounting structure. In some embodiments, the phone holder for a vehicle cup holder may be configured to secure a second personal data device to the vehicle.

18 Claims, 8 Drawing Sheets

PHONE HOLDER FOR A VEHICLE CUP HOLDER

CROSS REFERENCES TO RELATED APPLICATIONS

This application claims the benefit of priority to U.S. Provisional Application No. 63/296,198, filed 4 Jan. 2022, which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of arrangements of passenger fittings for beverages and hand-held devices, more specifically, a phone holder for a vehicle cup holder.

Summary of Invention

The phone holder for a vehicle cup holder is a mechanical structure configured for use with a vehicle cup holder. The phone holder for a vehicle cup holder is configured for use with a first personal data device. The phone holder for a vehicle cup holder secures the first personal data device to a vehicle. The phone holder for a vehicle cup holder comprises a mounting structure, a pedestal, and a threaded connection. The threaded connection attaches the pedestal to the mounting structure. The pedestal anchors the mounting structure into the vehicle cup holder. The first personal data device mounts in the mounting structure. In some embodiments, the phone holder for a vehicle cup holder may be configured to secure a second personal data device to the vehicle.

An object of the invention is to provide a phone holder that detachably inserts into a vehicle cup holder.

Another object of the invention is to a phone holder that holds a first personal data device in a plurality of slots.

A further object of the invention is to provide a phone holder that secures the first personal data device using a retaining structure.

Yet another object of the invention is to provide a phone holder that holds a first personal data device in a plurality of front slots and holds a second personal data device in a plurality of rear slots.

These together with additional objects, features and advantages of the phone holder for a vehicle cup holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the phone holder for a vehicle cup holder in detail, it is to be understood that the phone holder for a vehicle cup holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the phone holder for a vehicle cup holder.

It is therefore important that the claims be regarded as including such equivalent construction insofar as they do not depart from the spirit and scope of the phone holder for a vehicle cup holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
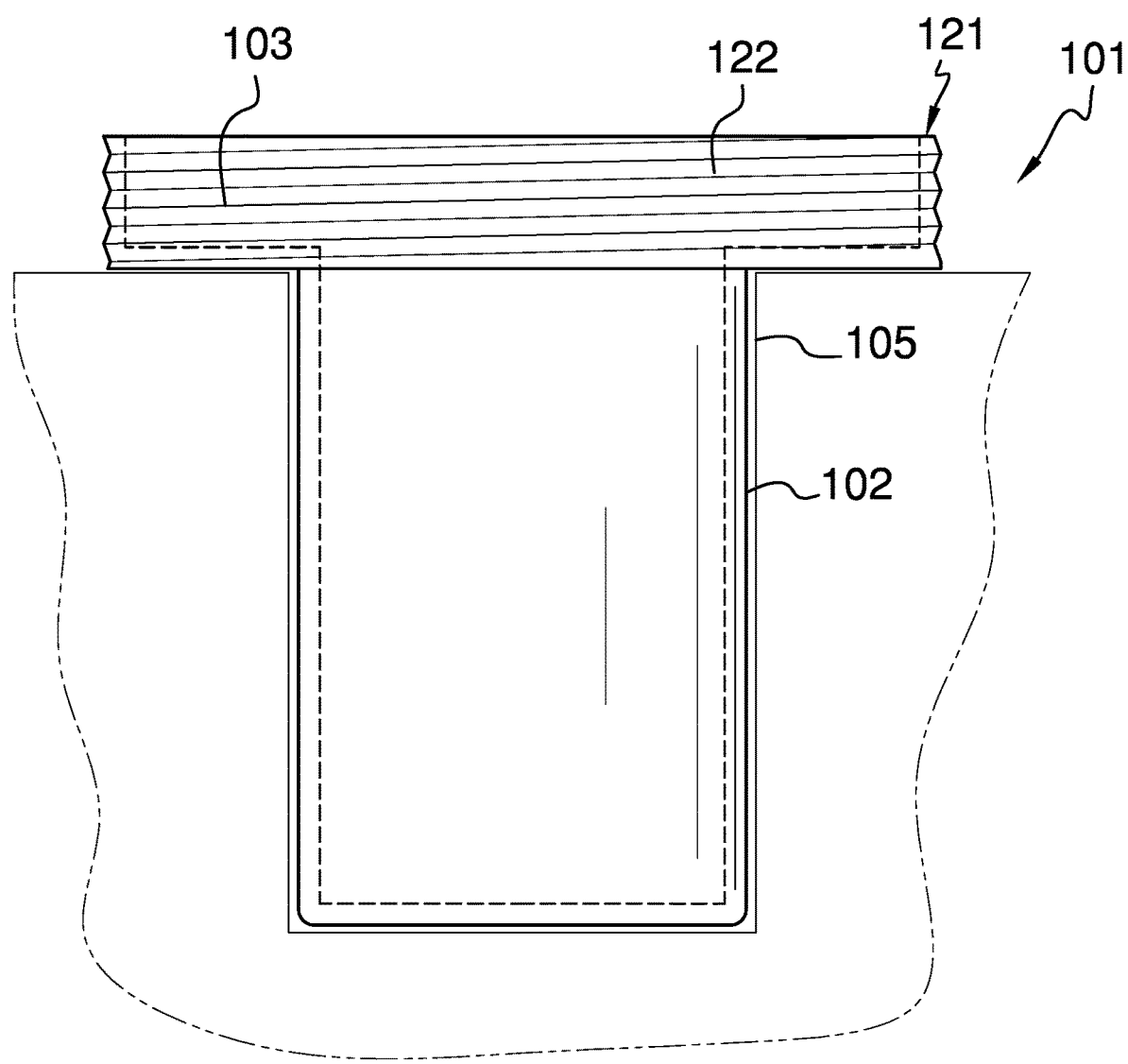
FIG. 1 is a rear view of an embodiment of the disclosure.
Figure 2:
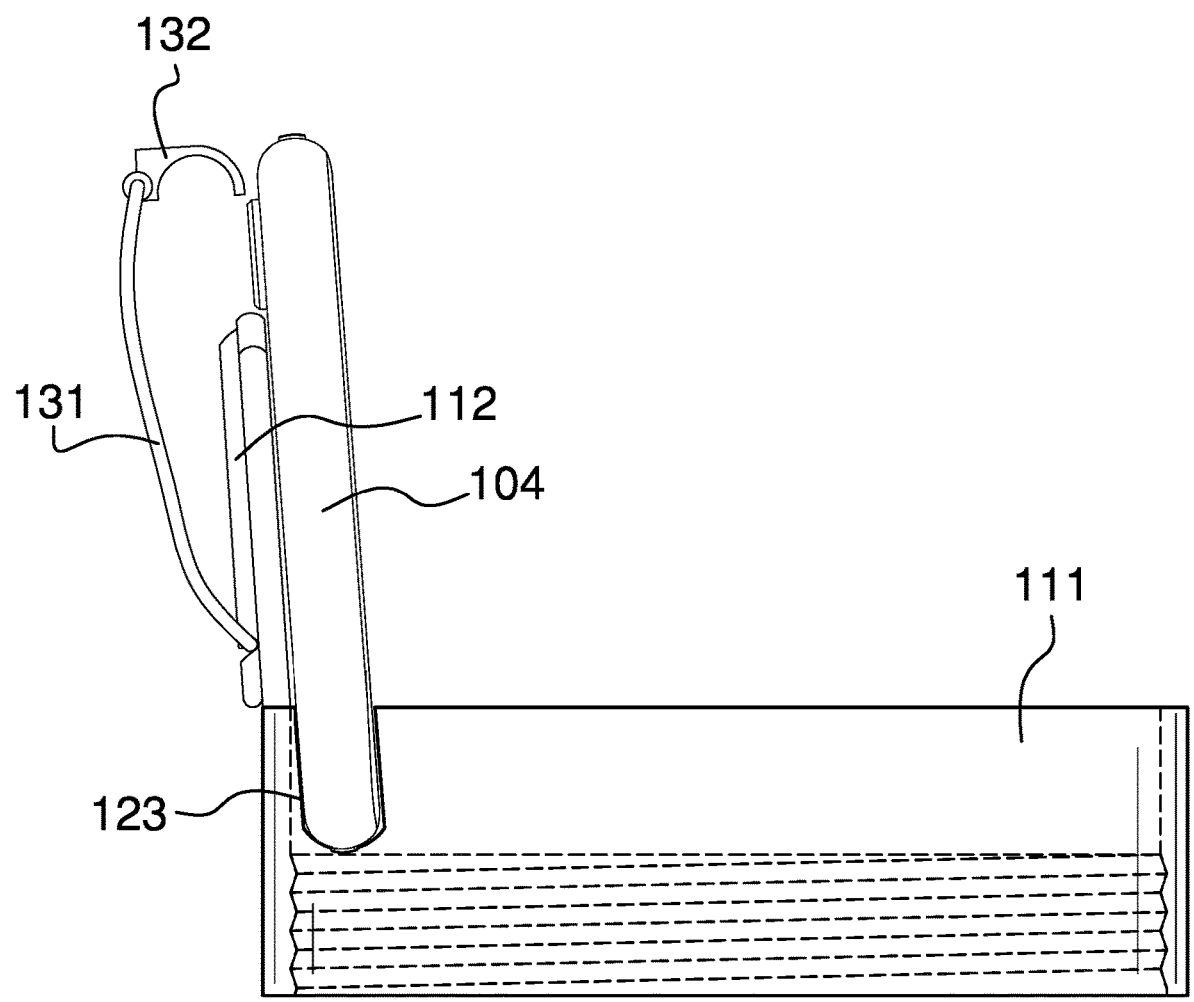
FIG. 2 is a side view of an embodiment of the disclosure.
Figure 3:
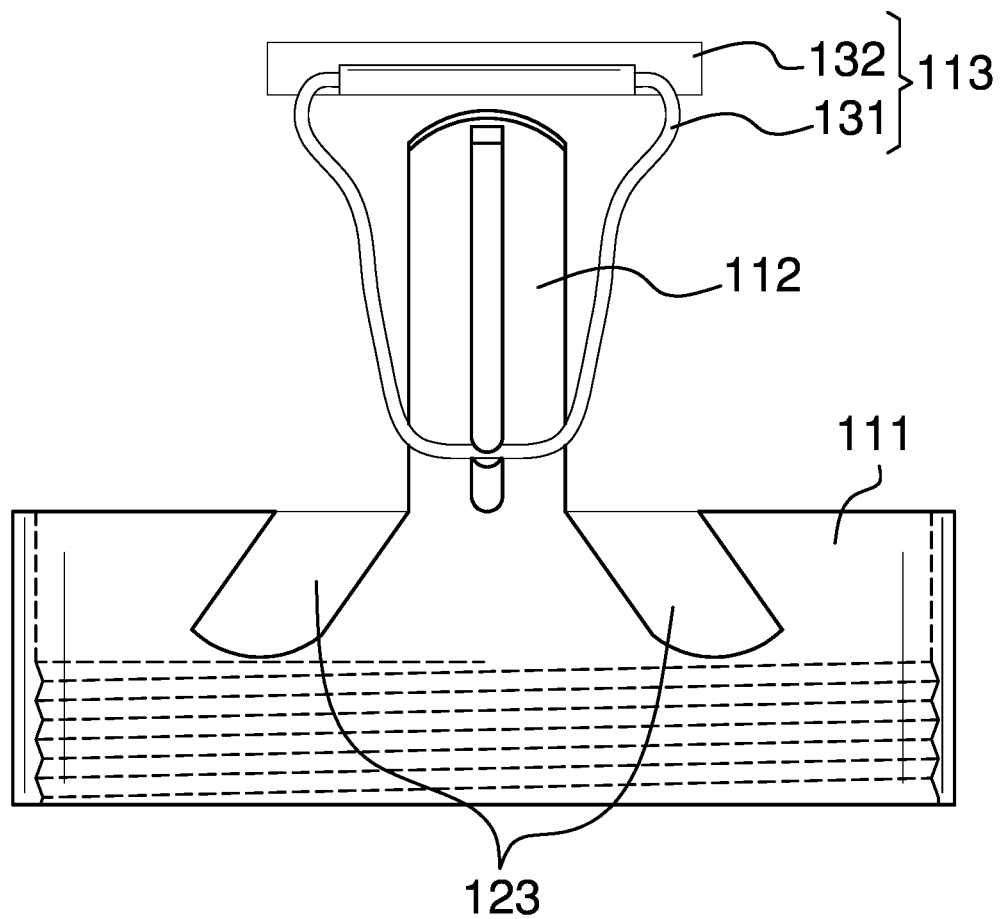
FIG. 3 is a front view of an embodiment of the disclosure.
Figure 4:
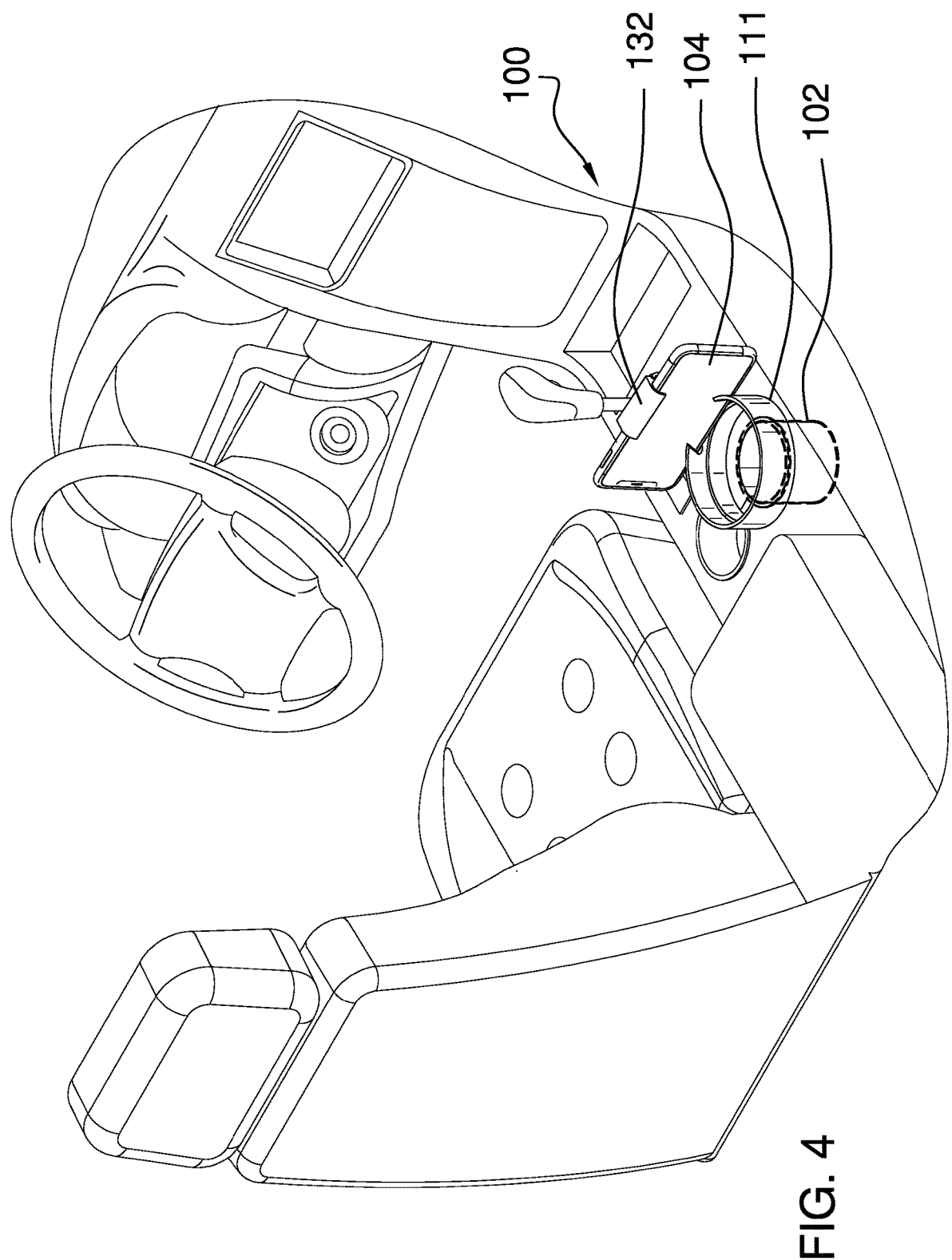
FIG. 4 is an in-use view of an embodiment of the disclosure.
Figure 5:
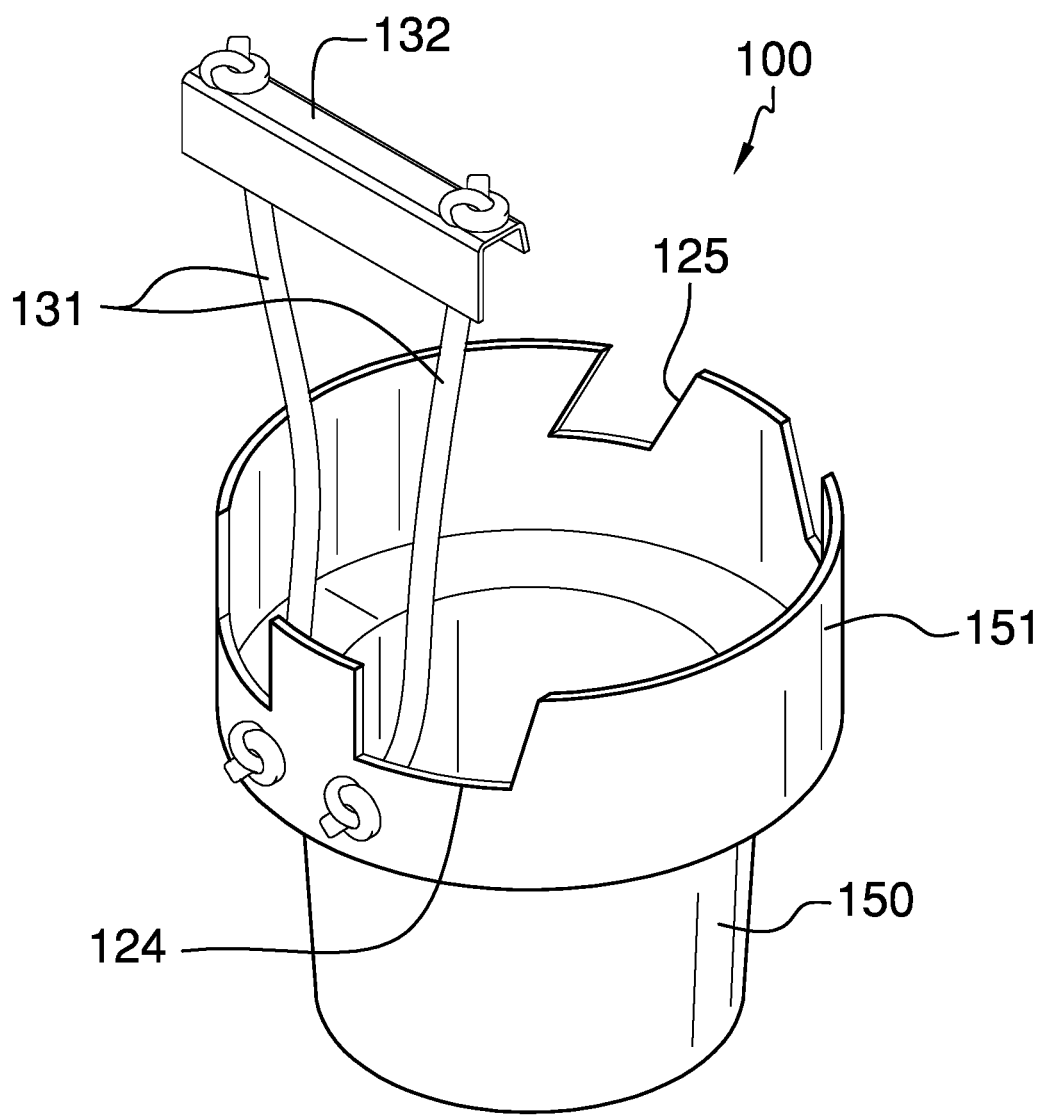
FIG. 5 is an isometric view of an alternative embodiment of the disclosure.
Figure 6:
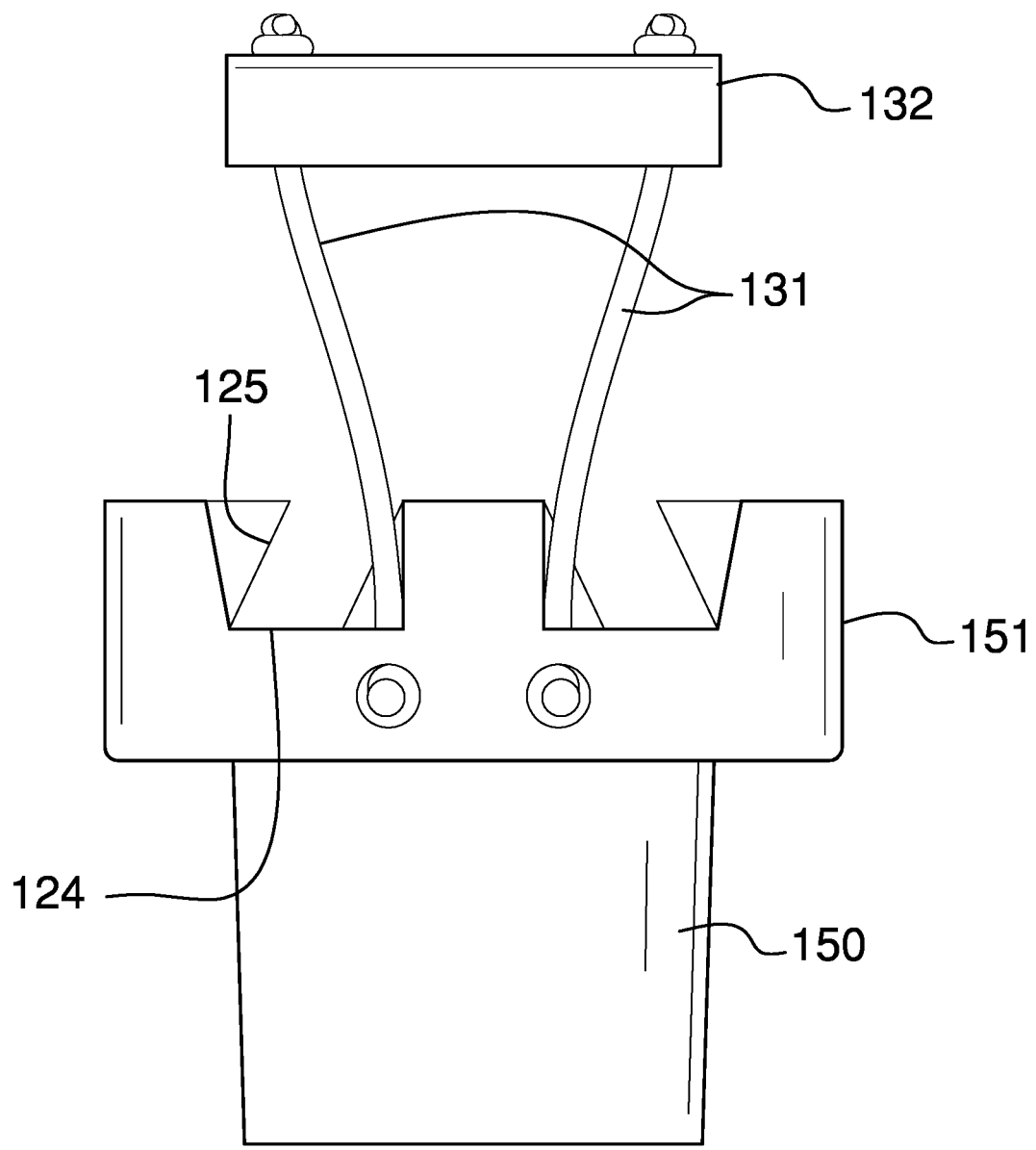
FIG. 6 is a front view of an alternative embodiment of the disclosure.
Figure 7:
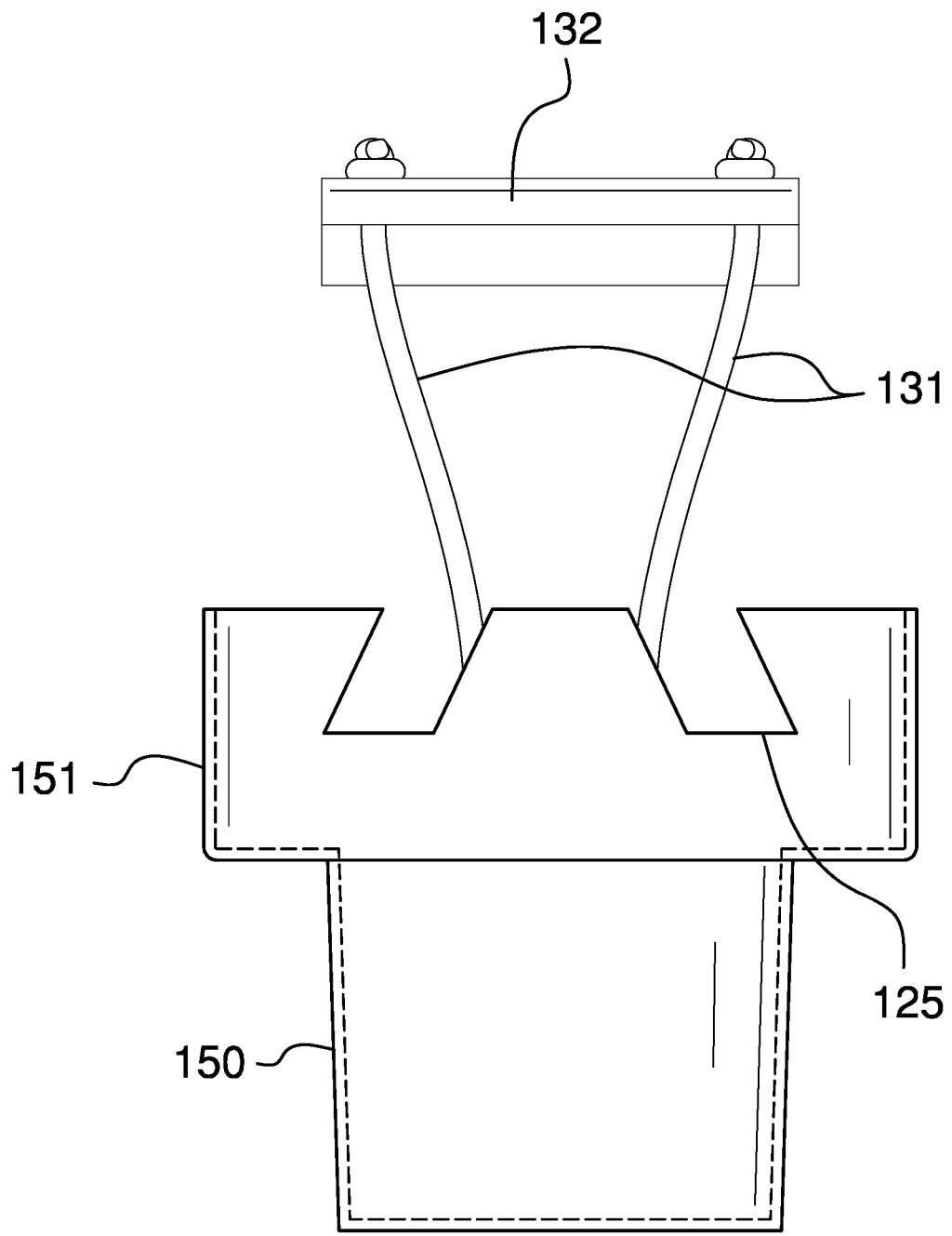
FIG. 7 is a rear view of an alternative embodiment of the disclosure.
Figure 8:
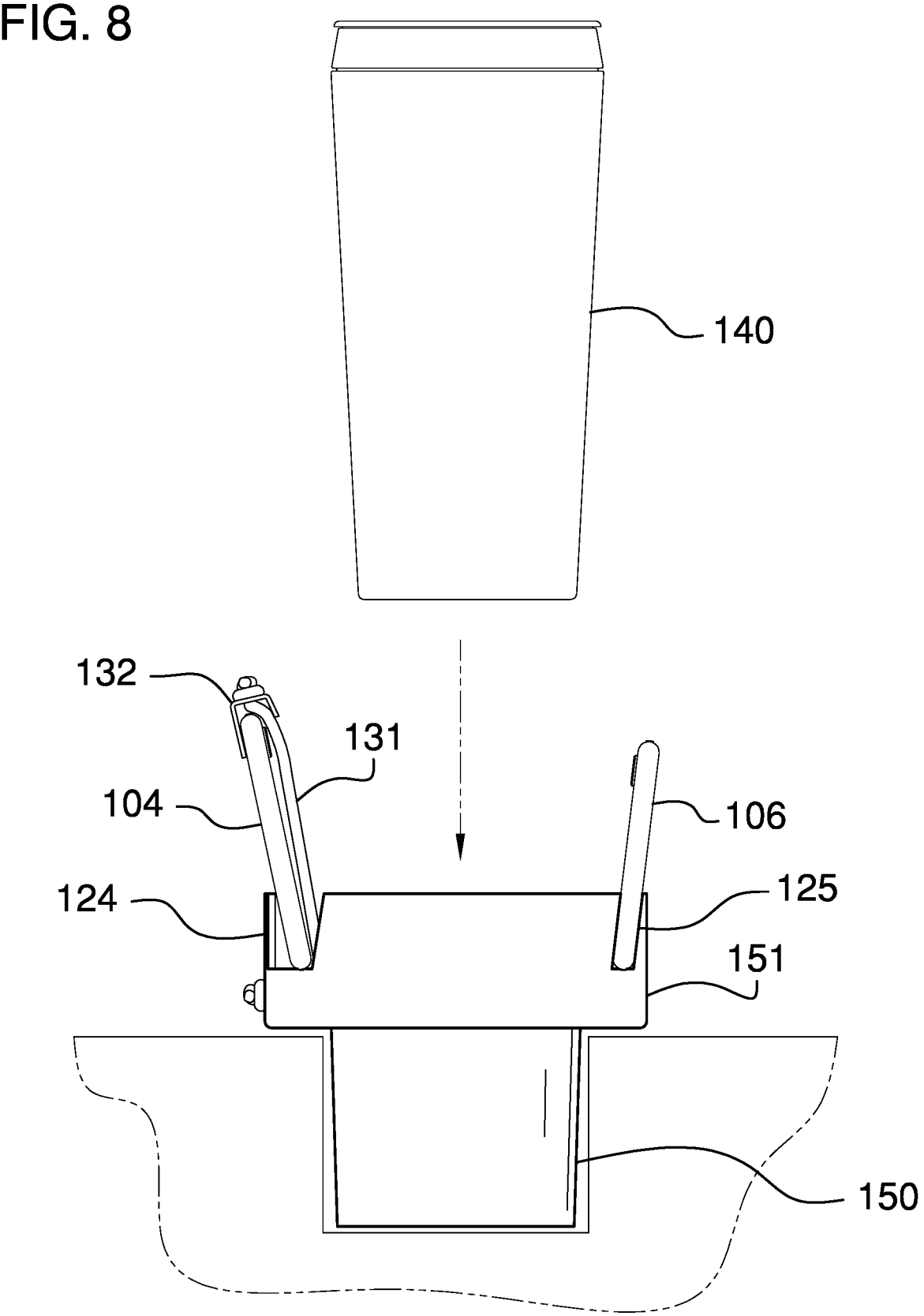
FIG. 8 is a side view of an alternative embodiment of the disclosure.

Detailed reference will now be made to a first potential embodiment of the disclosure, which is illustrated in FIGS. 1 through 8.

The phone holder for a vehicle cup holder 100 (hereinafter invention) is a mechanical structure configured for use with a vehicle cup holder 105. The invention 100 is configured for use with a first personal data device 104. The invention 100 secures the first personal data device 104 to a vehicle. The invention 100 comprises a mounting structure 101, a pedestal 102, and a threaded connection 103. The threaded connection 103 attaches the pedestal 102 to the mounting structure 101. The pedestal 102 anchors the mounting structure 101 into the vehicle cup holder 105. The first personal data device 104 mounts in the mounting structure 101. In some embodiments, the invention 100 may be configured to secure a second personal data device 106 to the vehicle.

The vehicle cup holder 105 is a negative space that is formed in the cab of a vehicle. The vehicle cup holder 105 is a prism shaped structure. The vehicle cup holder 105 may be pan shaped. The vehicle cup holder 105 forms a storage structure intended to contain a beverage. The pedestal 102 is geometrically complementary to the vehicle cup holder 105 such that the pedestal 102 inserts into the vehicle cup holder 105. The vehicle cup holder 105 forms an anchor point used to anchor the pedestal 102 into a fixed position relative to the vehicle cup holder 105.

The first personal data device 104 is a programmable electrical device. The first personal data device 104 further comprises an application. The first personal data device 104 provides data management and communication services through one or more functions referred to as an application. The application is a set of logical operating instructions that are performed by the first personal data device 104. The addition of an application will provide increased functionality for the first personal data device 104. Methods to design and implement an application on the first personal data device 104 are well known and documented in the electrical arts. The first personal data device 104 is defined elsewhere in this disclosure.

The threaded connection 103 is a fastening structure. The threaded connection 103 removably attaches the pedestal 102 to the mounting structure 101. The threaded connection 103 allows the mounting structure 101 to rotate relative to the pedestal 102 such that the position of the first personal data device 104 relative to the vehicle cup holder 105 can be adjusted into a desired fixed position. The threaded connection 103 is defined elsewhere in this disclosure.

The pedestal 102 is a mechanical structure. The pedestal 102 is a prism shaped structure. The pedestal 102 is geometrically complementary to the negative space formed by the vehicle cup holder 105. The pedestal 102 is sized such that the pedestal 102 inserts into the vehicle cup holder 105. The insertion of the pedestal 102 into the vehicle cup holder 105 anchors the mounting structure 101 and the first personal data device 104 into a fixed position relative to the vehicle cup holder 105.

The mounting structure 101 is a mechanical structure. The mounting structure 101 forms the superior structure of the invention 100. The mounting structure 101 forms the structure that secures the first personal data device 104 in a fixed position relative to the vehicle cup holder 105. The mounting structure 101 comprises a mounting ring 111, a vertical support 112, and a retaining structure 113.

The mounting ring 111 is a disk shaped structure. The mounting ring 111 has a semi-enclosed disk structure. The mounting ring 111 has a ring shape. The mounting ring 111 forms a ring shape. The threaded connection 103 attaches the mounting ring 111 to the pedestal 102 such that the congruent ends of the mounting ring 111 are horizontally oriented. The threaded connection 103 secures the mounting ring 111 to the pedestal 102 such that the mounting structure 101 rotates relative to the pedestal 102. The threaded connection 103 attaches the mounting ring 111 to the pedestal 102 such that the mounting ring 111 and the pedestal 102 form a composite prism structure. The mounting ring 111 comprises a perimeter structure 121, a characteristic aperture 122, and a plurality of slots 123.

The perimeter structure 121 forms the physical structure of the mounting ring 111. The perimeter structure 121 forms the exterior surfaces of the mounting ring 111. The perimeter structure 121 forms the lateral faces of the disk structure of the mounting ring 111.

The characteristic aperture 122 is a disk shaped negative space. The characteristic aperture 122 is formed through the congruent ends of the disk structure of the mounting ring 111. The characteristic aperture 122 forms the characteristic aperture 122 structure that is characteristic of a ring structure. The first personal data device 104 partially inserts into the negative space formed by the characteristic aperture 122.

Each of the plurality of slots 123 is a negative space that is formed through the lateral face structure of the perimeter structure 121. Each of the plurality of slots 123 is formed through the superior congruent end of the ring structure formed by the first personal data device 104. Each of the plurality of slots 123 is sized such that the edge of the first personal data device 104 will insert into the negative spaces formed by the plurality of slots 123. The plurality of slots 123 hold the first personal data device 104 in a fixed position when the first personal data device 104 is secured to the mounting structure 101.

The vertical support 112 is a disk shaped structure. The vertical support 112 attaches to the perimeter structure 121 of the mounting ring 111. The vertical support 112 attaches to the mounting ring 111 such that the congruent ends of the disk structure of the vertical support 112 have a roughly vertical orientation. The vertical support 112 attaches to the mounting ring 111 such that the vertical support 112 projects above the superior surface of the mounting ring 111. The vertically oriented congruent ends of the vertical support 112 forms a supporting surface that prevents the first personal data device 104 from rotating towards a horizontal orientation.

The retaining structure 113 is a mechanical structure. The retaining structure 113 permanently attaches to the exterior lateral surface of the disk structure of the mounting ring 111. The retaining structure 113 removably attaches to the first personal data device 104 when the first personal data device 104 inserts into the mounting ring 111. The retaining structure 113 is an elastic structure. The retaining structure 113 deforms when the retaining structure 113 attaches to the first personal data device 104. The first personal data device 104 prevents the retaining structure 113 from fully returning to a relaxed shape. The resulting counterforce applied by the retaining structure 113 to the first personal data device 104 holds the first personal data device 104 in a fixed position relative to the mounting ring 111. The retaining structure 113 comprises an elastic band 131 and a band hook 132.

The band hook 132 is a fastening structure. The band hook 132 removably attaches to the superior surface of the first personal data device 104. The elastic band 131 is a loop structure formed from an elastomeric material. The elastic band 131 permanently attaches to the exterior lateral surface of the disk structure of the mounting ring 111. The elastic band 131 is deformed as the band hook 132 is attached to the first personal data device 104. The counterforce generated by the elastic band 131 as the elastic band 131 is prevented from returning to a relaxed shape by the first personal data device 104 secures the first personal data device 104 into a fixed position within the mounting structure 101.

In an alternative embodiment, the invention 100 may comprise a flanged pedestal 150 that may be configured to be inserted into the vehicle cup holder 105. A flange 151 may be a projecting rim located at the top of the flanged pedestal 150. The flange 151 may be operable as the mounting structure 101. The retaining structure 113 may couple directly to the flange 151 of the flanged pedestal 150. The flange 151 may comprise a plurality of front slots 124 and a plurality of rear slots 125. The plurality of front slots 124 may be configured to hold the first personal data device 104 adjacent to the retaining structure 113. The plurality of rear slots 125 may be configured to hold the second personal data device 106. The plurality of rear slots 125 may be sized such that the edge of the second personal data device 106 will insert into the negative spaces formed by the plurality of rear slots 125. The plurality of rear slots 125 hold the second personal data device 106 in a fixed position when the second personal data device 106 is secured to the mounting structure 101. The plurality of rear slots 125 may orient the second personal data device 106 at an oblique angle such that the second personal data device 106 tilts away from a cup 140 placed into the vehicle cup holder 105.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "anchor" may be a device that holds an object in place. When used as a verb, "anchor" may refer to holding an object firmly or securely.

As used in this disclosure, an "anchor point" may be a location to which a first object can be securely attached to a second object.

As used in this disclosure, "composite prism" may refer to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

As used in this disclosure, "congruent" may be a term that compares a first object to a second object. Specifically, two objects are said to be congruent when: 1) they are geometrically similar; and, 2) the first object can be superimposed over the second object such that the first object aligns, within manufacturing tolerances, with second object. Always use Geometrically similar, correspond and one to one As used herein, the words "couple", "couples", "coupled" or "coupling", may refer to connecting, either directly or indirectly, and does not necessarily imply a mechanical connection.

As used in this disclosure, a "disk" may be a cylindrically shaped object with parallel opposing sides. A disk generally has a thickness (as measured from flat side to flat side) that is less than the radius of the cylinder.

As used in this disclosure, "elastic" may refer to a material or object that deforms when a force is applied to stretch or compress the material and that returns to its relaxed shape after the force is removed. A material that exhibits these qualities is also referred to as an elastomeric material.

As used in this disclosure, an "elastic band" may be a loop of textile that is formed using elastic material that can stretched. Alternatively, the elastic band can be a sheeting that is formed from latex, spandex, or an elastic plastic film that can be stretched.

As used in this disclosure, the word "exterior" may be used as a relational term that implies that an object is not located or contained within the boundary of a structure or a space.

As used in this disclosure, a "flange" may be a protruding rib, edge, or collar that is used to hold an object in place or to attach a first object to a second object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hook" may be an object that is curved or bent at an angle such that items can be hung on or caught by the object or such that the object may be suspended from another object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, "negative space" may be a method of defining an object through the use of open or empty space as the definition of the object itself, or, through the use of open or empty space to describe the boundaries of an object.

As used herein, "oblique angle" may refer to any angle that is not a right angle or a multiple of a right angle.

As used in this disclosure, "orientation" may refer to the positioning and/or angular alignment of a first object relative to a second object or relative to a reference position or reference direction.

As used herein, "pan" may refer to a hollow and prism-shaped containment structure. The pan has a single open face. The open face of the pan is often, but not always, the superior face of the pan.

As used in this disclosure, a "pedestal" may be an intermediary load bearing structure that is placed between a supporting surface and an object, structure, or load.

As used in this disclosure, a "perimeter" may be one or more curved or straight lines that bound an enclosed area on a plane or surface. The perimeter of a circle is commonly referred to as a circumference.

As used in this disclosure, a "personal data device" may be a handheld device that is used for managing personal information and communication. Examples of personal data device include, but are not limited to, cellular phones, tablet computers, and smart phones.

As used in this disclosure, a "prism" may be a 3 dimensional geometric structure wherein the form factor of two faces of the prism are congruent and the two congruent faces are parallel to each other. The two congruent faces are also commonly referred to as the ends of the prism. The surfaces that connect the two congruent faces are called that lateral faces. In this disclosure, when further description is required, a prism will be named for the geometric or descriptive name of the form factor of the two congruent faces. If the form factor of the two corresponding faces has no clearly established geometric or descriptive name, the term irregular prism will be used. The center axis of a prism is defined as a line that joins the center point of the first congruent face of the prism to the center point of the second corresponding congruent face of the prism. The center axis of a prism is otherwise analogous the center axis of a cylinder. A prism wherein the ends are circles is commonly referred to as a cylinder.

As used in this disclosure, a structure is considered to be in its "relaxed state" when no shear, strain, or torsional forces are being applied to the structure.

As used in this disclosure, a "rim" may be an outer edge or border that follows along the perimeter of an object.

As used in this disclosure, a "slot" may be a prism-shaped negative space formed as a groove, cut, opening, or aperture in or through an object.

As used in this disclosure, the term "superior" may refer to a directional reference that is parallel to and in the opposite direction of the force of gravity.

As used in this disclosure, a "supporting surface" may be a horizontal surface upon which an object is placed. Within this disclosure, it is assumed that the object is placed on the supporting surface in an orientation that is appropriate for the normal or anticipated use of the object.

As used in this disclosure, a "threaded connection" may be a type of fastener that is used to join a first tube shaped and a second tube shaped object together. The first tube shaped object is fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation. The term threaded connection could also be some mechanical arrangement whereby one part rotates (quarter turn, e.g.) with respect to the second part to lock in place.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A phone holder for a vehicle cup holder comprising:
a mounting structure and a pedestal;
wherein the phone holder for a vehicle cup holder is a mechanical structure configured for use with a vehicle cup holder;
wherein the phone holder for a vehicle cup holder is configured for use with a first personal data device;
wherein the phone holder for a vehicle cup holder secures the first personal data device to a vehicle;
wherein the pedestal anchors the mounting structure into the vehicle cup holder;
wherein the first personal data device mounts in the mounting structure;
wherein each of the plurality of slots is a negative space that is formed through a lateral face structure;
wherein each of the plurality of slots is formed through a superior congruent end of a ring structure formed by the first personal data device;
wherein each of the plurality of slots is sized such that an edge of the first personal data device will insert into the negative spaces formed by the plurality of slots;
wherein the plurality of slots hold the first personal data device in a fixed position when the first personal data device is secured to the mounting structure.

2. The phone holder for a vehicle cup holder according to claim 1
wherein the phone holder for a vehicle cup holder further comprises a threaded connection;
wherein the threaded connection attaches the pedestal to the mounting structure.

3. The phone holder for a vehicle cup holder according to claim 2
wherein the pedestal is geometrically complementary to the vehicle cup holder such that the pedestal inserts into the vehicle cup holder;
wherein the vehicle cup holder forms an anchor point used to anchor the pedestal into a fixed position relative to the vehicle cup holder.

4. The phone holder for a vehicle cup holder according to claim 3
wherein the threaded connection is a fastening structure;
wherein the threaded connection removably attaches the pedestal to the mounting structure;
wherein the threaded connection allows the mounting structure to rotate relative to the pedestal such that the position of the first personal data device relative to the vehicle cup holder can be adjusted into a desired fixed position;
wherein the threaded connection is defined elsewhere in this disclosure.

5. The phone holder for a vehicle cup holder according to claim 4
wherein the pedestal is a mechanical structure;
wherein the pedestal is a prism shaped structure;
wherein the pedestal is geometrically complementary to the negative space formed by the vehicle cup holder;
wherein the pedestal is sized such that the pedestal inserts into the vehicle cup holder;
wherein the insertion of the pedestal into the vehicle cup holder anchors the mounting structure and the first personal data device into a fixed position relative to the vehicle cup holder.

6. The phone holder for a vehicle cup holder according to claim 5
wherein the threaded connection attaches the mounting ring to the pedestal such that the congruent ends of the mounting ring are horizontally oriented;
wherein the threaded connection secures the mounting ring to the pedestal such that the mounting structure rotates relative to the pedestal;
wherein the threaded connection attaches the mounting ring to the pedestal such that the mounting ring and the pedestal form a composite prism structure;

wherein the mounting ring comprises a perimeter structure, a characteristic aperture, and a plurality of slots.

7. The phone holder for a vehicle cup holder according to claim 6
wherein the mounting ring is a disk shaped structure;
wherein the mounting ring has a semi-enclosed disk structure;
wherein the mounting ring has a ring shape;
wherein the mounting ring forms a ring shape;
wherein the perimeter structure forms the physical structure of the mounting ring;
wherein the perimeter structure forms the exterior surfaces of the mounting ring;
wherein the perimeter structure forms the lateral faces of the disk structure of the mounting ring.

8. The phone holder for a vehicle cup holder according to claim 1
wherein the mounting structure is a mechanical structure;
wherein the mounting structure forms the superior structure of the phone holder for a vehicle cup holder;
wherein the mounting structure forms the structure that secures the first personal data device in a fixed position relative to the vehicle cup holder;
wherein the mounting structure comprises a mounting ring, a vertical support, and a retaining structure.

9. The phone holder for a vehicle cup holder according to claim 8
wherein the characteristic aperture is a disk shaped negative space;
wherein the characteristic aperture is formed through the congruent ends of the disk structure of the mounting ring;
wherein the characteristic aperture forms the characteristic aperture structure that is characteristic of the ring structure.

10. The phone holder for a vehicle cup holder according to claim 9
wherein the first personal data device partially inserts into the negative space formed by the characteristic aperture.

11. The phone holder for a vehicle cup holder according to claim 10
wherein the vertical support is a disk shaped structure;
wherein the vertical support attaches to the mounting ring;
wherein the vertical support attaches to the mounting ring such that the congruent ends of the disk structure of the vertical support have a vertical orientation;
wherein the vertical support attaches to the mounting ring such that the vertical support projects above the superior surface of the mounting ring;
wherein the vertically oriented congruent ends of the vertical support forms a supporting surface that prevents the first personal data device from rotating towards a horizontal orientation.

12. The phone holder for a vehicle cup holder according to claim 11
wherein the retaining structure is a mechanical structure;
wherein the retaining structure permanently attaches to the exterior lateral surface of the disk structure of the mounting ring;
wherein the retaining structure removably attaches to the first personal data device when the first personal data device inserts into the mounting ring.

13. The phone holder for a vehicle cup holder according to claim 12
wherein the retaining structure is an elastic structure;
wherein the retaining structure deforms when the retaining structure attaches to the first personal data device;
wherein the first personal data device prevents the retaining structure from fully returning to a relaxed shape;
wherein the resulting counterforce applied by the retaining structure to the first personal data device holds the first personal data device in a fixed position relative to the mounting ring;
wherein the retaining structure comprises an elastic band and a band hook.

14. The phone holder for a vehicle cup holder according to claim 13
wherein the band hook is a fastening structure;
wherein the band hook removably attaches to the superior surface of the first personal data device;
wherein the elastic band is a loop structure formed from an elastomeric material;
wherein the elastic band permanently attaches to the exterior lateral surface of the disk structure of the mounting ring;
wherein the elastic band is deformed as the band hook is attached to the first personal data device;
wherein the counterforce generated by the elastic band as the elastic band is prevented from returning to a relaxed shape by the first personal data device secures the first personal data device into a fixed position within the mounting structure.

15. The phone holder for a vehicle cup holder according to claim 1
wherein the phone holder for a vehicle cup holder comprises a flanged pedestal that is configured to be inserted into the vehicle cup holder;
wherein a flange is a projecting rim located at the top of the flanged pedestal;
wherein the flange is operable as the mounting structure;
wherein the retaining structure couples directly to the flange of the flanged pedestal.

16. The phone holder for a vehicle cup holder according to claim 15
wherein the flange comprises a plurality of front slots and a plurality of rear slots;
wherein the plurality of front slots are configured to hold the first personal data device adjacent to a retaining structure;
wherein the plurality of rear slots are configured to hold a second personal data device.

17. The phone holder for a vehicle cup holder according to claim 16
wherein the plurality of rear slots are sized such that the edge of the second personal data device will insert into the negative spaces formed by the plurality of rear slots;
wherein the plurality of rear slots hold the second personal data device in a fixed position when the second personal data device is secured to the mounting structure.

18. The phone holder for a vehicle cup holder according to claim 17
wherein the plurality of rear slots orient the second personal data device at an oblique angle such that the second personal data device tilts away from a cup placed into the vehicle cup holder.

* * * * *